Jan. 17, 1967   J. A. WAUGH ETAL   3,298,882
PROCESS OF PRODUCING FLEXIBLE GLASS
FLAKE ELECTRICAL INSULATION
Filed Jan. 19, 1961
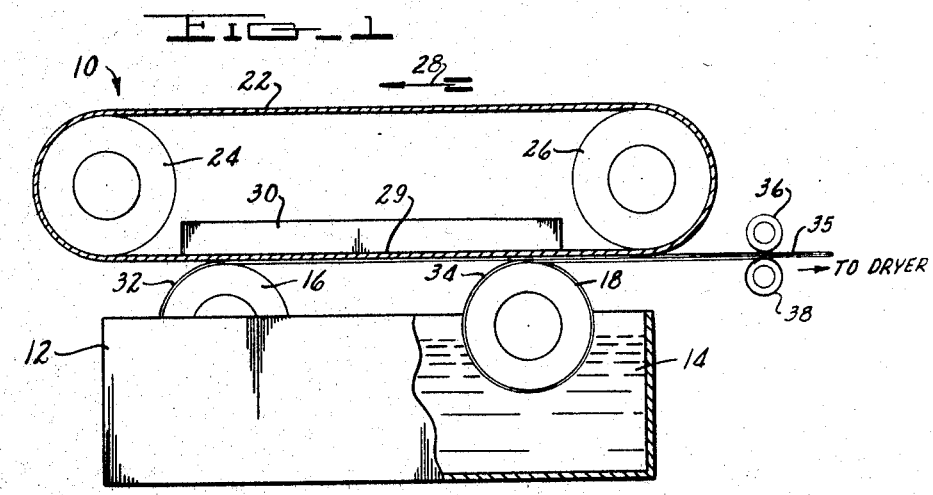
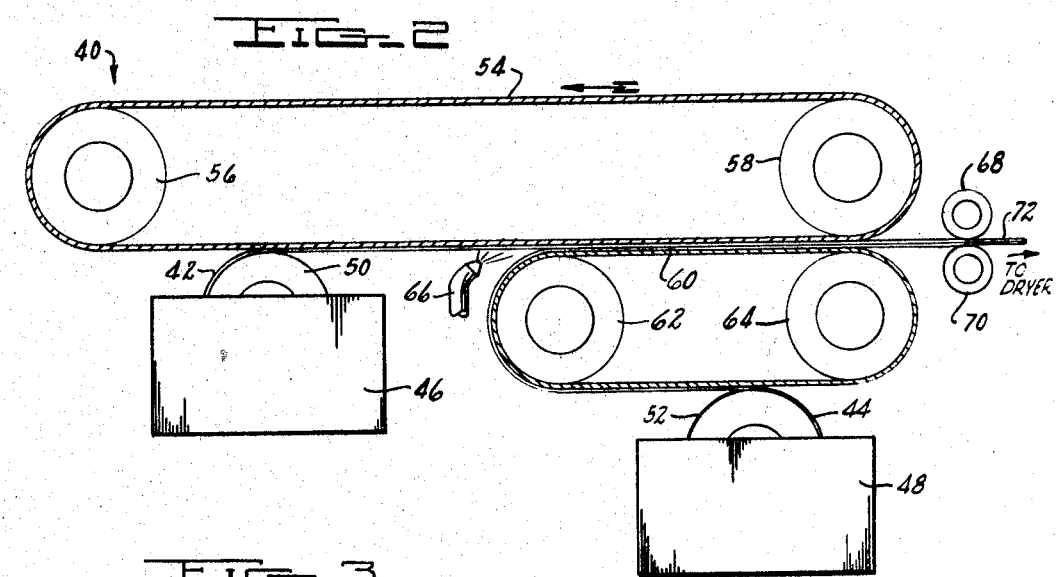
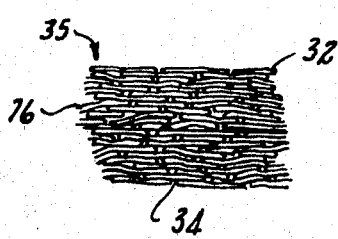
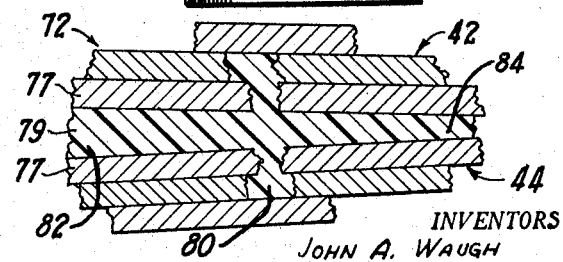
INVENTORS
JOHN A. WAUGH
LESLIE L. WARNER
BY
ATTORNEYS United States Patent Office 3,298,882
Patented Jan. 17, 1967

3,298,882
PROCESS OF PRODUCING FLEXIBLE GLASS
FLAKE ELECTRICAL INSULATION
John A. Waugh, Huntingdon, Pa., and Leslie L. Warner, Roswell, N. Mex., assignors to Owens-Corning Fiberglas Corporation, Toledo, Ohio, a corporation of Delaware
Filed Jan. 19, 1961, Ser. No. 83,823
5 Claims. (Cl. 156—62.8)

This invention relates to glass flake products, and more particularly to electrical insulation sheets made of glass flakes in which the glass flakes are bonded together into sheet form by the use of little or no binder material other than water.

Flakes made of glass have a high dielectric strength, measured up to 2800 volts per mil. Such high dielectric strength makes glass flakes particularly suitable for imparting dielectric characteristics to paper-like sheets in which they are incorporated. Because of the geometry of the flakes, it is possible to produce a network of platelets similar to that displayed in mica paper or sheets, which act as a dielectric barrier when subjected to electrical voltage.

Flake platelets in thicknesses ranging from .00003 to .0002 inch and having random area dimensions of up to ½ inch have proven highly successful for such purposes. An additional characteristic which lends to the suitability of glass flakes for this purpose is the resistance of glass flakes to chemical degradation as a result of materials to which the glass flakes come in contact with during use.

Theoretically, the best dielectric properties are obtained in sheets composed of 100% glass flakes. However, in the past, it has been necessary to use large amounts of binding agents alone or small amounts of binding agents in combination with filler material to hold a glass flake structure together. Without the use of binding agents and filler, the flake structure has been weak and has tended to fall apart with handling. The binding agents and fillers used in the past have in all instances had a lower dielectric strength than the glass flakes. The lower dielectric strength of the binding agents and fillers has reduced the overall dielectric strength of the resultant insulating material. Therefore, it has been considered desirable to reduce or eliminate the binding agents and fillers utilized fabricate glass flake sheets.

The present invention offers a solution to this problem in which two sheets of water-wet glass flakes are laminated together by pressing the water-wet sheets together and then drying the resultant laminate. This basic process has been supplemented to produce an improved flexible sheet by careful selection of the flake material, by the pretreatment of the glass flakes, and by the after treatment of the resultant glass flake sheet. In a further embodiment, a binder is used but the filler material is eliminated.

It is an object of this invention to produce a flake glass structure similar to mica and which has a high dielectric strength, which is flexible and which has adaptability as an electrical insulation sheet having properties of uniform character reproducible within a predetermined range of dielectric strengths and physical properties.

A further object of the invention is to produce a glass flake structure in which the glass flakes are welded together without the necessity of a separate binder material.

Another object of the invention is to produce a laminated glass flake sheet by laminating two or more water-wet glass flake sheets together.

An additional object of the invention is to produce a laminated glass flake sheet as above but in which a binder material is provided to give improved flexure and tensile strength.

A still further object of the invention resides in the use of selected flat glass flakes to result in an improved glass flake structure.

Another object of the invention is to pretreat the glass flakes with a weak acid bath to improve the surface attraction of the glass flakes.

A further object is to incorporate mica platelets with glass flakes to produce a composite mica-glass flake sheet structure having improved dielectric strength and reduced water absorption characteristics.

Other objects and features which we believe to be characteristic of our invention are set forth with particularity in the appended claims. Our invention itself, however, both in organization and manner of construction, together with further objects and advantages thereof, may be best understood by reference to the following description taken in connection with the accompanying drawings in which:

FIGURE 1 is a diagrammatic view of a process for producing flexible glass sheets, without the use of a binder, of high dielectric strength in accordance with one embodiment of the invention;

FIGURE 2 is a diagrammatic view of a process for producing flexible glass flake sheets, with a binder, of high dielectric strength in accordance with another embodiment of this invention; and FIGURE 3 is a cross-sectional view of a glass flake sheet produced according to the embodiment illustrated in FIGURE 1;

FIGURE 4 is an enlarged cross-sectional view of the center portion of a glass flake sheet produced according to the embodiment illustrated in FIGURE 2.

Glass flakes forming the composite structure of the present invention are of a type which can be produced by processes such as those disclosed in U.S. Patent No. 2,457,785, issued to Slayter and Snow on December 28, 1948, U.S. Patent No. 2,509,845, issued to Slayter on May 30, 1950, or U.S. Patent No. 2,780,889, issued to Fulk on February 12, 1957.

The processes for producing glass flakes as disclosed in these patents comprise essentially melting glass in a glass melter, ejecting a stream of molten glass from the melter through an orifice, attenuating the molten stream into a thin walled structure, solidifying the thin walled structure and then breaking it into individual glass flakes.

It is preferred according to the present invention to use glass flakes in the form of flat platelets. The flat configuration is produced during the attenuation process of making glass flakes by pulling the glass straight down from the glass melter orifice. Glass flakes produced by pulling the glass at an angle from the orifice, or glass flakes having ridges, curls or corrugations do not produce a resultant flake sheet having physical and electrical properties equivalent to sheets produced from flat platelets.

An example of a glass composition from which the flakes can be made for the present invention is the following:

| | Percent |
|---|---|
| Silicon dioxide | 54 |
| Calcium oxide | 16 |
| Aluminum oxide | 16 |
| Boron oxide | 10 |
| Sodium and potassium oxide | 4 |

Glass flakes of the above composition have a high moisture resistance and chemical stability. Their density is 2.549 and hardness is from 6 to 7 on the Moh scale. Their dielectric strength is up to 2800 volts per mil, while the dielectric constant is 6.43 at 100 cycles and 6.11 at 1 megacycle. Their tensile strength is approximately 100,000 p.s.i., and their modulus of elasticity is 10.5 times $10^6$ p.s.i.

As previously mentioned, the physical and electrical properties of the flake glass sheets are improved if the individual glass flakes are treated with a weak acid solution prior to formation of the sheet. The treatment comprises boiling a mixture of glass flakes and a water solution of hydrochloric acid for from 20 minutes to ½ of an hour. After this treatment, the glass flakes are washed to neutralize the acid thereon. The concentration of hydrochloric acid is preferably sufficient to provide a pH of from 3 to 6. If the solution contains 2% hydrochloric acid, the resultant glass flake will have a red hue. If the solution contains 5% hydrochloric acid, the resultant flake will have blue hue.

Acid treated glass flakes have an increased surface attraction and tend to bond together to a higher degree than do untreated flakes. It is believed that this increased surface attraction may result from two factors. The first is similar to the well known "Johanssen" block phenomena wherein two clean highly finished flat metal surfaces when pressed together will exhibit a bond equal to several atmospheres. The acid treatment removes all of the impurities from the surface of the flat flakes and when pressed together, particularly in a water system, the flakes stick to each other in a manner similar to Johanssen blocks.

It is also believed that the acid may form a monomolecular layer of silica gel on the surface of the flakes. The gel, in the presence of water, acts cooperatively with the Johanssen effect as an adhesive between the flakes. The formation of the gel solution may be defined as a treatment to provide a surface active agent.

FIGURE 1 illustrates one method of fabricating a laminated two-sheet glass flake structure in which a binder is not used. Conventional paper making apparatus comprising a cylinder machine 10 is utilized to form the glass flake sheet. The apparatus 10 comprises a tank 12 which contains a water slurry 14 of glass flakes. The glass flakes are preferably present in an amount of from 0.2 to 0.5% by weight in the slurry. Two rotatable cylinders 16, 18 having perforate peripheral surfaces are provided in the tank 12 with the lower portions of the cylinders dipping into the slurry and the upper portions of the cylinder extending above the level of the slurry. The cylinders are of the conventional type in which the interiors thereof provide a pressure differential as a result of the difference in the water head in the cylinder and level of liquid in tank 12 to draw glass flakes from the slurry onto the outer surface of the cylinders as the cylinders rotate to form a glass flake layer 32, 34 on each cylinder. The speed of rotation of the cylinders, the amount of draw provided by the cylinders and the concentration of the flake in the slurry will determine the thickness of the layers 32, 34.

Positioned above the cylinders 16, 18 is an endless porous felt 22 the lower run 29 of which is tangential to the periphery of the cylinders. The felt 22 is mounted for movement on rollers 24, 26 which rotate counterclockwise to move the felt in the direction of arrow 28. A suction box 30 is positioned on the upper surface of the lower run 29 intermediate the cylinders 24, 26. The box 30 provides a vacuum to draw and hold the layers of glass flake to the underside of the felt 22. However, the presence of such a box 30 is not essential to holding the layers of glass flake to the felt. Prior to being transferred to the felt 22, most of the water will have been drained from the glass flakes by gravity and vacuum. However, the flakes are still water-wet at this point.

The glass flake sheets 32, 34 are joined together in facial contact at the upper portion of the cylinder 18 and are then directed between heated calendering rollers 36, 38. At this point, the glass flakes are still water-wet. The rollers 36, 38 apply heat and pressure to the sheets 32, 34, thus driving out the most of the remaining water, welding individual adjacent glass flakes together, and laminating the sheets 32, 34 one to the other to form the final laminated sheet 35. Subsequent to lamination, the laminated sheet 35 is directed into a drying oven (not shown) to evaporate the remaining moisture therefrom. Photomicrographs of the water-wetted platelets indicate the presence of glass in water solution on the platelet surfaces and this glass in solution welds together under pressure as during calendering, both to bond the platelets to one another and to bond the laminated sheets together.

A cross-sectional view of the laminated sheet 35, produced according to the FIGURE 1 embodiment is illustrated in FIGURE 3. Each glass flake sheet 32, 34 comprises a plurality of individual glass flakes 76, having an overlapping construction wherein the flakes are compacted in surface to surface engagement in intimate association in planar distribution and having a depth equal to the thickness of a plurality of glass flakes.

The provision of a laminated structure such as above described is preferred. However, for some applications a single unlaminated sheet of glass flakes may be fabricated. The two-sheet structure is preferred because when two sheets are laminated together, weak or thin spots which may be present in one sheet are compensated for by the second sheet to thus result in a final product of substantially uniform thickness throughout. The laminated sheet thus has substantially uniform physical and electrical properties per unit area. In addition to fabricating a single sheet, a laminated sheet of more than two layers may be formed by the above described wet laminating method. However, as the thickness of the final sheet is increased, flexibility is decreased.

A 100% glass flake sheet has a dielectric strength as measured of from 500 volts per mil to 1300 volts per mil. The average is 800 volts per mil, measured on a 5 mil thick sheet. In tests conducted on a sheet one inch wide and five mils thick, the tensile strength was found to vary from 20 to 24 lbs.

Sheets produced from flat glass flakes fabricated by attenuating the glass by pulling straight from the glass melting orifice as opposed to pulling the glass at an angle from the orifice produced a superior glass flake sheet as evidenced by the following data:

FLAKES PRODUCED BY PULLING AT AN ANGLE

Dielectric strength: high 525 volts per mil, low 325 volts per mil, average 417 volts per mil.

The above values were obtained on a sheet of 4.0 mils in thickness and with a ¼ inch diameter electrode.

FLAKES PRODUCED BY PULLING STRAIGHT DOWN

Dielectric strength: high 1040 volts per mil, low 714 volts per mil, average 844 volts per mil.

The above values were obtained from a sheet 7.7 mils in thickness and were determined with a 2 inch diameter electrode over an area 50 times the area tested with the ¼ diameter electrode as above.

FIGURE 2 illustrates a second embodiment of flake glass sheet produced in accordance with the invention and in which a binder material is used. As there shown, a split level cylinder machine 40 is utilized to produce the two layers 42, 44 of flake glass. Two tanks 46, 48 are provided to contain a water slurry of flake glass. Each tank has a perforated cylinder 50, 52 to pick up a layer of flake glass from the slurry. An endless felt 54 mounted over the cylinders 56, 58 is provided to pick up the glass flake layers 42, 44 after they have been formed. As will be noted, a suction box is not provided within the felt 54, such a suction box being only optionally used in the process of either FIGURES 1 or 2.

An intermediate felt 60 mounted between cylinders 62, 64 is provided to pick up the glass flake layer 44 from the cylinder 52 and deliver it to the main felt 54.

As will be noted, a spray nozzle 66 is provided intermediate the cylinders 50, 52. The nozzle 66 is connected to a source of binder material (not shown) and ejects a spray of the binder material on one surface of the glass flake layer 42 before the layers 42, 44 are laminated together. The function of the binder material is to improve the flexibility, tensile strength, bond and other physical and electrical properties of the resultant laminated glass flake structure. As will be appreciated, by applying the binder only to the surfaces to be joined, the total amount of binder used is substantially less than would be the case where the flakes were completely wetted with a binder to join them together to form a laminated structure.

Suitable binder materials are, for example, silicone and epoxy resin and shellac. The binder is preferably of the type which may be used without a solvent. Preferably, the resin is of a type which will set only after the water has been squeezed out of the flake glass laminated structure.

When a solvent-type binder is used, the non-volatile portion of the binder solution may be incorporated in amounts up to 20% by weight of the glass flake sheet. When non-solvent type binders are used, the binder may comprise considerably more than 20% by weight of the final sheet.

After the layers 42, 44 have been brought together on the felt 60, they are directed between heated calendering rolls 68, 70. During the calendering operation, the binder material is forced into the interstices between the individual glass flakes adjacent the adjoining surfaces. Subsequent to calendering, the laminated sheet 72 is directed to a dryer to drive off any remaining moisture and to set the binder.

A cross-sectional view of the center portion of the laminated sheet 72, produced according to the FIGURE 2 embodiment, is illustrated in FIGURE 4. Each glass flake sheet 42, 44, similarly to the laminated sheet 35, comprises a plurality of individual glass flakes 77, having an overlapping construction wherein the flakes are compacted in surface to surface engagement in intimate association in planar distribution and having a depth equal to the thickness of a plurality of glass flakes. As will be noted, the binder 79 has been squeezed as at 80 between the surface gaps in each of the two abutting sheets, forming a mechanical bond as well as an adhesive bond.

As will also be noted in FIGURE 4, the binder 79 is thicker at some points than at others, for example at 82 than 84. The binder thus acts to even out the thick and thin portions of the sheets 42, 44 and maintains constant the thickness of the laminated sheet 72. The thickness is determined by the setting of the calendering rolls 68, 70. Instead of the two rolls shown, a stack of calendering rolls may be employed for close control of thickness.

As in the case of the FIGURE 1 embodiment, a single unlaminated sheet of glass flake may be produced with a resin binder. However, such single sheets will have the disadvantage of the presence of weak or thin spots as is the case with a single sheet of glass flakes without the binder material.

The glass flake sheets produced by either the methods of FIGURE 1 or FIGURE 2 have a relatively rough surface and also a tendency to delaminate, i.e. for the individual flakes to loosen and fall off. This tendency is overcome if a thin film is applied over the exterior surfaces of the sheets. Useful surface coating materials are, for example, polyethylene, perephthalate resin, vinylidene chloride polymers or copolymers, polyurethane, polyester resins, and highly beaten glassine pulp. Glassine pulp is preferred in that it provides an inexpensive, smooth and durable surface. In addition to applying a surface coating to the glass flake sheets, a separate sheet of a tough material such as a glass fabric may be laminated thereto.

In addition to the use of only glass flake materials in the construction of electrical insulation, a composition comprising mica platelets and glass flakes may also be utilized. The mica may be used in amounts of from 40 to 60% by weight and the glass flake in amounts of from 60 to 40% by weight. It is preferred to use mica platelets and glass flakes of substantially equal size in order to obtain a uniform mica-glass structure. The mica-glass structure has excellent dielectric properties and low water absorption characteristics.

Strips of flexible glass flake sheets produced according to the present invention can also be laminated with an electrically conductive film such as aluminum foil to produce a material which is useful in the fabrication of electrical capacitors. Such material may be used to manufacture either dry type or oil filled capacitors for high or normal temperatures at reasonable cost.

We claim:

1. The method for producing flexible glass flake electrical insulating material comprising first boiling glass flakes in a hydrochloric acid solution and subsequently neutralizing the glass flakes, forming a water slurry of said neutralized flakes, withdrawing flakes from the slurry to form at least two separate sheets of water-wet glass flakes, joining the so formed sheets in surface to surface contact, and then compressing said sheets together to drive off the water, laminate the sheets together, and compact the individual glass flakes together in overlapping engagement.

2. The method for producing flexible glass flake electrical insulating material comprising first boiling glass flakes in a hydrochloric acid solution and subsequently neutralizing the glass flakes, forming a water-wet sheet of said neutralized flakes, and compressing said sheet to drive off the water and weld the individual glass flakes together in surface-to-surface engagement.

3. In a method of fabricating a composite sheet material,
the steps of
dispersing glass flakes in aqueous HCl of a pH in the range 3–6 and boiling the solution,
removing the solution from the flakes,
suspending the flakes in water,
sheeting the flakes by flow of the aqueous solution into two separate, water-wet sheets,
superimposing the two water-wet sheets on one another in major surface contact,
thereafter compressing the two so superimposed sheets together,
relieving the pressure,
and drying to produce a strong, coherent, composite sheet wherein the flakes are oriented in parallel alignment with their major surfaces in intimate, contacting relationship.

4. In a method of forming a composite sheet material, the steps of
dispersing glass flakes in aqueous acid and boiling the solution to etch the surfaces of the flakes,
removing the solution from the flakes,
suspending the flakes in water,
sheeting the flakes from the water,
drying the sheets,
and applying a thin, protective film of coating composition to an exterior surface of the composite sheet material.

5. In a method of fabricating a composite sheet material,
the steps of
dispersing glass flakes in aqueous HCl of a pH in the range 3–6 and boiling the solution,
removing the solution from the flakes,
suspending the flakes in water,
sheeting the flakes,
and drying.

(References on following page)

References Cited by the Examiner

UNITED STATES PATENTS

| | | |
|---|---|---|
| 726,485 | 4/1903 | Whitney. |
| 1,616,901 | 2/1927 | Kirschbraun 162—124 |
| 2,405,576 | 8/1946 | Heyman 125—24 |
| 2,549,880 | 4/1951 | Bardet 154—2.6 |
| 2,635,390 | 4/1953 | Parker 162—156 |
| 2,810,425 | 10/1957 | Heyman 154—2.6 |
| 2,859,794 | 11/1958 | Barr 154—2.6 |
| 3,012,930 | 12/1961 | Labino 156—24 |
| 3,066,065 | 11/1962 | Koerner et al. 154—2.6 |

FOREIGN PATENTS 553,104   5/1943   Great Britain.

OTHER REFERENCES

Properties of "Paper made from Glass Flakes" by T. D. Callinan et al., pub. in the Journal of the Electrochemical Society, vol. 3, No. 10, Oct. 1956, pp. 543–545 cited.

Morgan "Glass Reinforced Plastics," p. 188 cited (1957).

ALEXANDER WYMAN, *Primary Examiner.*

CARL F. KRAFFT, EARL M. BERGERT, *Examiners.*

W. F. ZAGURSKI, R. J. ROCHE, *Assistant Examiners.*